US012162278B2

(12) United States Patent
Shibata et al.

(10) Patent No.: US 12,162,278 B2
(45) Date of Patent: Dec. 10, 2024

(54) METHOD FOR CONTROLLING DRIVING OF INKJET HEAD, AND INKJET RECORDING APPARATUS

(71) Applicant: Konica Minolta, Inc., Tokyo (JP)

(72) Inventors: Takuma Shibata, Hachioji (JP); Takakazu Kuki, Fuchu (JP)

(73) Assignee: KONICA MINOLTA, INC., Tokyo (JP)

( * ) Notice: Subject to any disclaimer, the term of this patent is extended or adjusted under 35 U.S.C. 154(b) by 133 days.

(21) Appl. No.: 18/002,046

(22) PCT Filed: Jun. 29, 2020

(86) PCT No.: PCT/JP2020/025497
§ 371 (c)(1),
(2) Date: Dec. 15, 2022

(87) PCT Pub. No.: WO2022/003771
PCT Pub. Date: Jan. 6, 2022

(65) Prior Publication Data
US 2023/0226816 A1 Jul. 20, 2023

(51) Int. Cl.
*B41J 2/045* (2006.01)
*B41J 2/155* (2006.01)

(52) U.S. Cl.
CPC ....... *B41J 2/04541* (2013.01); *B41J 2/04508* (2013.01); *B41J 2/04591* (2013.01); *B41J 2/04595* (2013.01); *B41J 2/155* (2013.01)

(58) Field of Classification Search
CPC .................................................... B41J 2/04595
See application file for complete search history.

(56) References Cited

U.S. PATENT DOCUMENTS 6,488,349 B1 * 12/2002 Matsuo ................ B41J 2/04581 347/11
2003/0122888 A1 7/2003 Baba et al.
(Continued)

FOREIGN PATENT DOCUMENTS

JP 2003-175601 A 6/2003
JP 2009-066821 A 4/2009
JP 2017-226201 A 12/2017

OTHER PUBLICATIONS

Extended European Search Report dated Jul. 24, 2023 for the corresponding Application No. 20942682.4.
(Continued)

*Primary Examiner* — Shelby L Fidler
(74) *Attorney, Agent, or Firm* — LUCAS & MERCANTI, LLP

(57) ABSTRACT

There is provided a method for controlling driving of an inkjet head including recording elements each including a nozzle and a driving element. The method includes a pulse width setting step. In this step, when a predetermined number of ink droplets ejected according to the predetermined number of driving pulses are made to land in the same pixel range, the predetermined number of first driving pulses each having a pulse width longer than a reference pulse width and the predetermined number of second driving pulses each having a pulse width shorter than the reference pulse width are combined for each of the recording elements and obtained combinations are respectively output to the recording elements. The predetermined number is two or more.

10 Claims, 9 Drawing Sheets

(56) References Cited

U.S. PATENT DOCUMENTS

| | | | | |
|---|---|---|---|---|
| 2007/0182774 A1* | 8/2007 | Iriguchi | B41J 2/14209 | 347/11 |
| 2014/0327714 A1* | 11/2014 | Iwata | B41J 2/04596 | 347/11 |
| 2021/0283905 A1* | 9/2021 | Mawatari | B05C 5/02 | |

OTHER PUBLICATIONS

International Search Report for the corresponding application No. PCT/JP2020/025497, dated Sep. 15, 2020, with English translation.

Japanese Patent Office, Notice of Reasons for Refusal mailed Feb. 6, 2024, which was issued for related Japanese Patent Application No. 2022-533273, with English translation, 9 pages.

International Preliminary Report on Patentability dated Dec. 13, 2022 for the corresponding application No. PCT/JP2020/025497, with English translation.

* cited by examiner

METHOD FOR CONTROLLING DRIVING OF INKJET HEAD, AND INKJET RECORDING APPARATUS

CROSS REFERENCE TO RELATED APPLICATION

This Application is a 371 of PCT/JP2020/025497 filed on Jun. 29, 2020, which is incorporated herein by reference.

TECHNICAL FIELD

The present invention relates to a method for controlling the driving of an inkjet head and an inkjet recording apparatus.

BACKGROUND ART

There is a technique for changing the density gradation of each pixel range by causing a plurality of continuously ejected ink droplets to land in the same pixel range, either in combination in the middle or separately, in an inkjet recording apparatus that forms a desired image, structure, thin film, and the like on a medium by ejecting ink droplets from nozzles. In the inkjet recording apparatus, there are variations in ink ejection characteristics between nozzles. In particular, when ejecting a plurality of ink droplets continuously, the influence of the previous ejection operation tends to affect the subsequent ejection operation. For this reason, the variation tends to be large and complicated.

In order to reduce the influence of the variation, there is a technique of adjusting an electrical signal (driving pulse) for driving a driving element, which applies a pressure fluctuation to ink in a nozzle, for each driving element. Patent Literature 1 discloses a technique of adjusting the fall timing of the driving waveform in the driving pulse of each driving element to match the amount of ink droplets and the landing timing each other.

CITATION LIST

Patent Literature

Patent Document 1: JP 2017-226201A

SUMMARY OF THE INVENTION

Technical Problem

Conventionally, however, inkjet heads with variations in ink ejection characteristics above the standard have been discarded as non-standard products. As the number of nozzles increases and demands for ink ejection characteristics increase, there is a problem that the yield of inkjet heads decreases, leading to an increase in cost, and the like.

It is an object of the present invention to provide a method for controlling the driving of an inkjet head and an inkjet recording apparatus capable of obtaining an inkjet head that can be used with reduced variations in ejection characteristics in a wider range.

Solution to Problem

In order to achieve the aforementioned object, an invention described claim 1 is a method for controlling driving of an inkjet head including a plurality of recording elements each including a nozzle through which ink is ejected and a driving element that applies a pressure fluctuation to ink supplied to the nozzle according to an applied driving pulse. A reference pulse width of the driving pulse that maximizes a predetermined characteristic value related to ink droplets ejected by each of the recording elements according to the driving pulse applied to the driving element with respect to a change in pulse width of the driving pulse has a variation equal to or greater than a predetermined standard. The driving control method includes a pulse width setting step in which, when a predetermined number (two or more) of ink droplets ejected according to the predetermined number of driving pulses are made to land in the same pixel range, the predetermined number of first driving pulses each having a pulse width longer than the reference pulse width and the predetermined number of second driving pulses each having a pulse width shorter than the reference pulse width are combined for each of the plurality of recording elements and obtained combinations are respectively output to the plurality of recording elements.

According to an invention described in claim 2, in the driving control method described in claim 1, in the pulse width setting step, the first driving pulse having a pulse width longer than any of the reference pulse widths related to the plurality of recording elements and the second driving pulse having a pulse width shorter than any of the reference pulse widths are set.

According to an invention described in claim 3, in the driving control method described in claim 2, in the pulse width setting step, the pulse width of the first driving pulse and the pulse width of the second driving pulse are commonly set for the plurality of recording elements.

According to an invention described in claim 4, in the driving control method described in any one of claims 1 to 3, in the pulse width setting step, an order of the first driving pulse and the second driving pulse is set such that a pulse width closer to the reference pulse width corresponding to a minimum one of the maximum characteristic values related to the plurality of recording elements becomes a last driving pulse.

According to an invention described in claim 5, in the driving control method described in any one of claims 1 to 4, the predetermined characteristic value is a droplet speed of ejected ink.

According to an invention described in claim 6, in the driving control method described in any one of claims 1 to 4, the predetermined characteristic value is an amount of ink droplets to be ejected.

According to an invention described in claim 7, in the driving control method described in any one of claims 1 to 6, the predetermined standard for the variation is 3%.

According to an invention described in claim 8, in the driving control method described in any one of claims 1 to 7, the predetermined number is an even number, and in the pulse width setting step, the first driving pulse and the second driving pulse are set so as to be alternately output.

An invention described in claim 9 is an inkjet recording apparatus including: an inkjet head including a plurality of recording elements each including a nozzle through which ink is ejected and a driving element that applies a pressure fluctuation to ink supplied to the nozzle according to an applied driving pulse; and a control unit that controls an output of the driving pulse applied to the driving element to each of the recording elements. A reference pulse width of the driving pulse that maximizes a predetermined characteristic value related to ink droplets ejected by each of the recording elements according to the driving pulse applied to the driving element with respect to a change in pulse width of the driving pulse has a variation equal to or greater than a predetermined standard. When a predetermined number (two or more) of ink droplets ejected according to the predetermined number of driving pulses are made to land in the same pixel range, the control unit combines the predetermined number of first driving pulses each having a pulse width longer than the reference pulse width and the predetermined number of second driving pulses each having a pulse width shorter than the reference pulse width with each other for each of the plurality of recording elements and outputs obtained combinations to the plurality of recording elements, respectively.

Advantageous Effects of Invention

According to the present invention, there is an effect that it is possible to more easily reduce variations in ejection characteristics between nozzles.

DETAILED DESCRIPTION

Hereinafter, an embodiment of the present invention will be described with reference to the diagrams.

Figure 1:
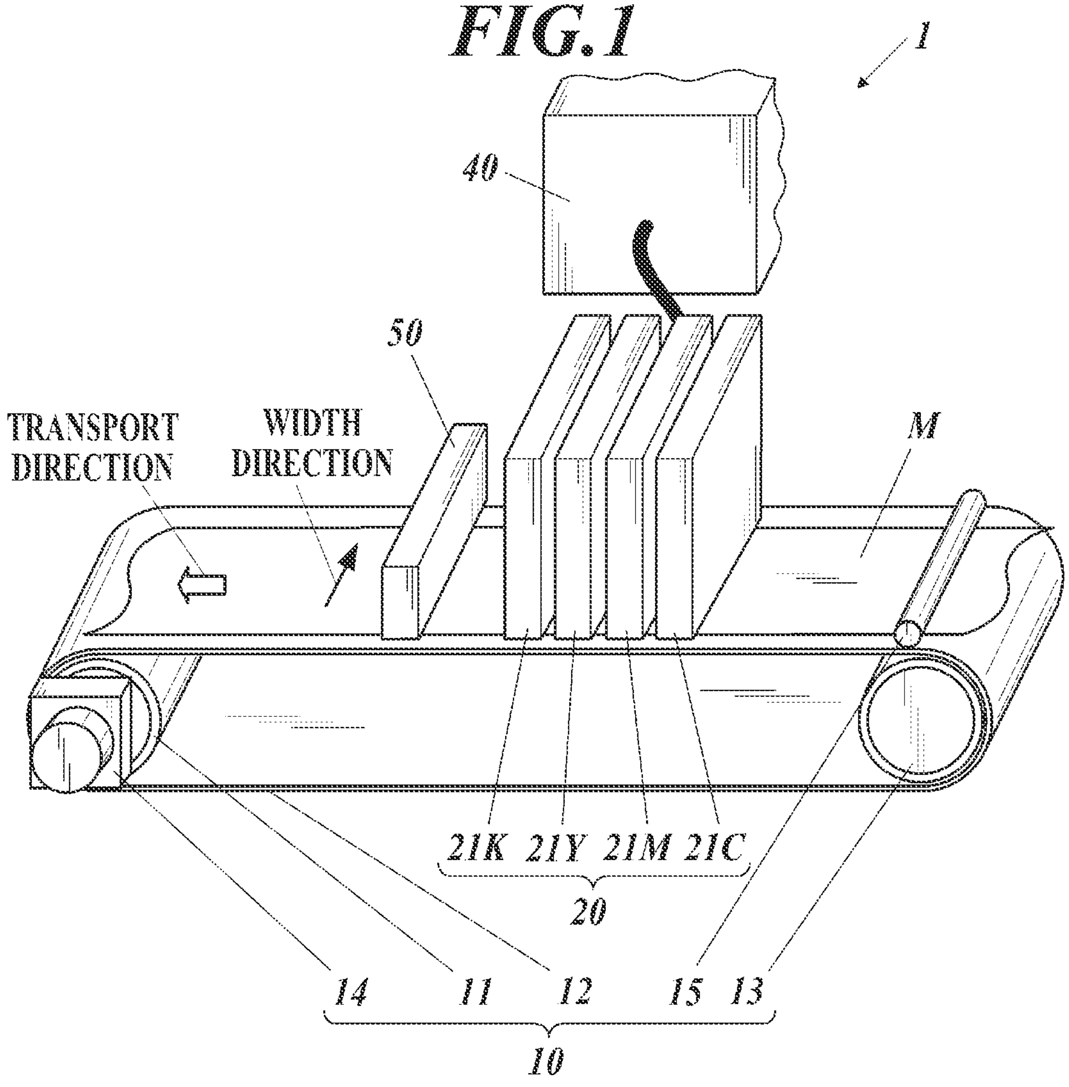
FIG. 1 is a perspective view showing the schematic configuration of an inkjet recording apparatus.

FIG. 1 is a perspective view showing the schematic configuration of an inkjet recording apparatus 1 according to the present embodiment.

The inkjet recording apparatus 1 includes a transport unit 10, a recording operation unit 20, a control unit 40, an image capturing unit 50, and the like.

The transport unit 10 moves a medium M on which the image is to be recorded, and ejects the medium M through an image recording position. The transport unit 10 includes a driving roller 11, a transport belt 12, a driven roller 13, a transport motor 14, a pressing roller 15, and the like.

The transport belt 12 is endless and is stretched between the driving roller 11 and the driven roller 13, and moves as the driving roller 11 rotates. The driving roller 11 rotates at a speed according to the rotation of the transport motor 14. The driven roller 13 rotates at a speed according to the movement of the transport belt 12. An image is recorded on the medium M while being moved in a state in which the medium M is placed at a predetermined position on the outer peripheral surface of the transport belt 12, and the medium M is discharged at a predetermined position after the image is recorded. The pressing roller 15 presses the medium M placed on the transport belt 12 against the transport belt 12 to remove lifting of the medium M due to wrinkles or the like. The pressing roller 15 may press the medium M against the transport belt 12 by its own weight and rotate according to the movement of the medium M and the transport belt 12.

The recording operation unit 20 has a plurality of nozzles that eject ink onto the medium M on the transport belt 12, and records an image according to the timing and amount of ink ejected from each nozzle. Although not particularly limited, the recording operation unit 20 includes a head unit 21C that ejects cyan ink, a head unit 21M that ejects magenta ink, a head unit 21Y that ejects yellow ink, and a head unit 21K that ejects black ink. That is, the recording operation unit 20 can eject four colors of ink. Hereinafter, some or all of these are also referred to as a head unit 21.

The control unit 40 centrally controls the overall operation of the inkjet recording apparatus 1. The control unit 40 will be described later.

The image capturing unit 50 images the surface of the transport belt 12 (medium M placed thereon) on the downstream side of the recording operation unit 20 in the transport direction of the medium M on the transport belt 12 by the transport unit 10. The image capturing unit 50 is, for example, a line sensor in which a CCD (Charge-Coupled Device) imaging element or a CMOS (Complementary Metal Oxide Semiconductor) imaging element is arranged in the width direction, and two-dimensional imaging on the medium M is possible in combination with the movement of the medium M in the transport direction.

Figure 2:
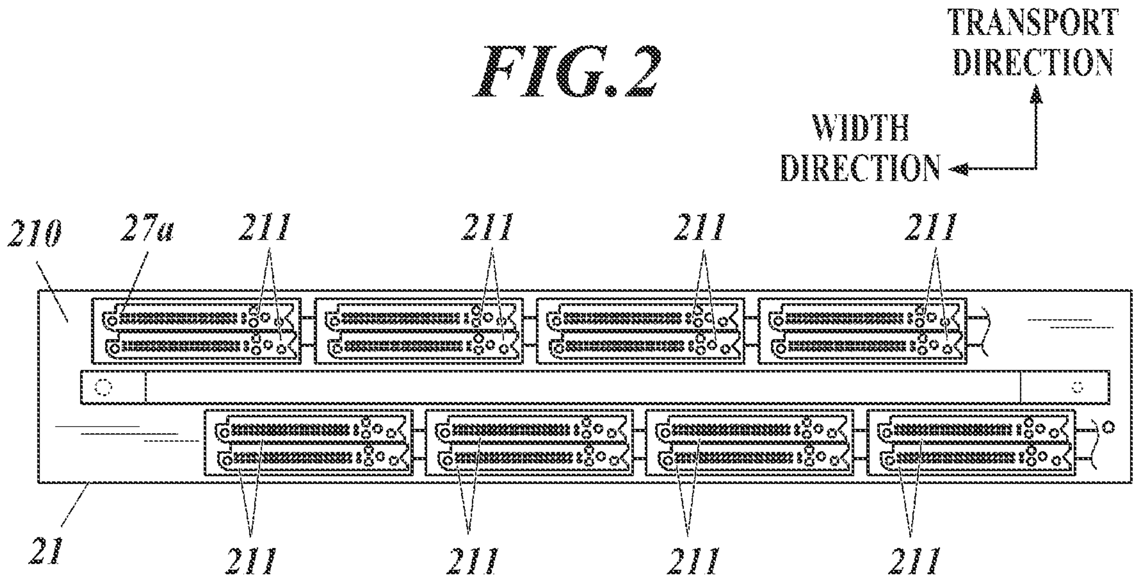
FIG. 2 is a bottom view showing a bottom surface of a head unit facing a transport belt.

FIG. 2 is a bottom view showing a surface (bottom surface) of the head unit 21 facing the transport belt 12. Since the head units 21C, 21M, 21Y, and 21K have the same structure, only one of these will be described herein.

The head unit 21 is fixed to a carriage 210. Nozzle surfaces of 16 inkjet heads 211 provided in the head unit 21 are exposed to the bottom surface of the head unit 21. A large number of nozzle openings 27*a* are arranged on each nozzle surface. The openings 27*a* are arranged at predetermined intervals (nozzle pitches) in the width direction so that the ejected ink lands at each position in the width direction on the medium M being transported.

Figure 3:
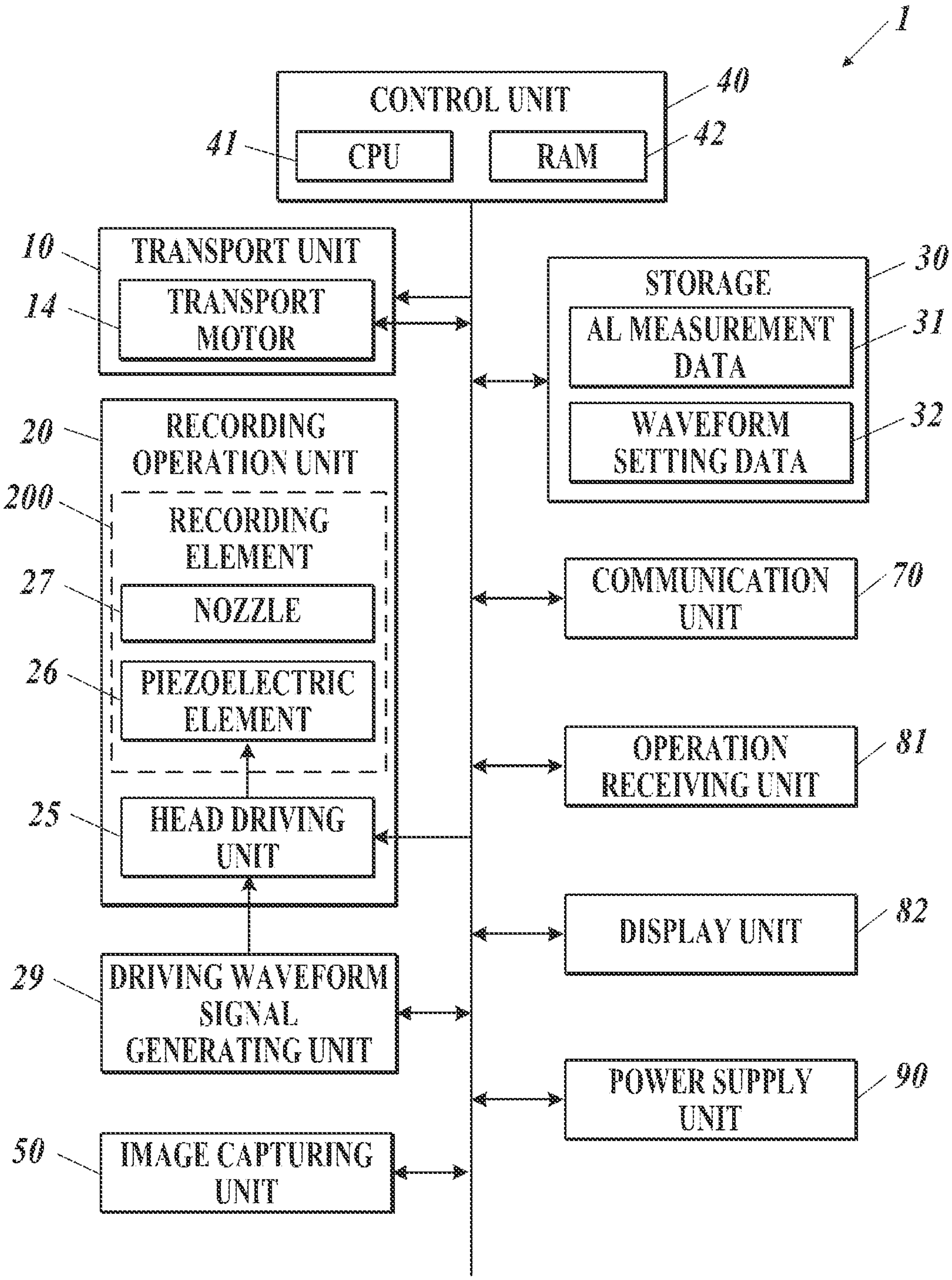
FIG. 3 is a block diagram showing the functional configuration of an inkjet recording apparatus.

FIG. 3 is a block diagram showing the functional configuration of the inkjet recording apparatus 1.

The inkjet recording apparatus 1 includes a driving waveform signal generating unit 29, a storage 30, a communication unit 70, an operation receiving unit 81, a display unit 82, and a power supply unit 90, and the like in addition to the transport unit 10, the recording operation unit 20, the control unit 40, and the image capturing unit 50 described above.

The transport unit 10 includes the transport motor 14 as described above, and outputs an appropriate driving signal to the transport motor 14 to rotate the transport motor 14.

The recording operation unit 20 includes a head driving unit 25, a piezoelectric element 26 (driving element), and the like. The head driving unit 25 applies a driving signal (driving pulse) to the selected piezoelectric element 26 to deform the piezoelectric element 26. As a result, the piezoelectric element 26 applies a pressure fluctuation corresponding to the driving pulse to the ink supplied to a nozzle 27 to cause the ink to be ejected from the nozzle 27, thereby recording an image. The piezoelectric element 26 and the nozzle 27 form a recording element 200 according to the present embodiment. The recording operation unit 20 has a plurality of recording elements 200 corresponding to the number of nozzles 27.

The driving waveform signal generating unit 29 generates a driving pulse output from the head driving unit 25 to the recording element 200. Although not particularly limited, the driving waveform signal generating unit 29 converts digital data indicating a predetermined driving waveform into analog data, and outputs a signal obtained by amplifying the voltage and current to the head driving unit 25 as a driving pulse.

The control unit 40 is a processor that includes a CPU 41 (Central Processing Unit) and a RAM 42 (Random Access Memory) and performs overall control of various operations of the inkjet recording apparatus 1. The CPU 41 performs various kinds of arithmetic processing to perform control operations. The RAM 42 provides a working memory space for the CPU 41, and stores temporary data. The control unit 40 controls the output of driving pulses related to the ink ejection operation of the inkjet head 211 to the recording element 200 based on image data to be recorded, setting data related to image recording, and the like.

The storage 30 stores image data to be recorded, and also stores various programs or setting data. The storage 30 may have at least a non-volatile memory, or may have a volatile memory (RAM). The image data may be stored in the RAM. The setting data includes AL (Acoustic Length) measurement data 31 and waveform setting data 32. The non-volatile memory is, for example, a flash memory and the like and may additionally or alternatively have an HDD (Hard Disk Drive) and the like.

The AL measurement data 31 stores the actual AL (reference pulse width) measurement value related to the ink inside each nozzle 27 (including an ink flow path communicating with the nozzle 27). The AL is half the resonance period (acoustic resonance period) of pressure vibration occurring in the ink (fluid) in the nozzle 27. The AL depends on the structure of the nozzle 27 and the like, that is, the length, width, and the like of the nozzle 27. Since the nozzle and the ink flow path communicate with a common ink supply path on the further upstream side, the AL may deviate slightly from the theoretically accurate value. there is a slight variation in the structure due to manufacturing, and the AL also varies slightly according to the variation. The AL measurement data 31 does not need to include the ALs of all the nozzles 27, and may be sampled at predetermined intervals or the like, or ALs obtained by partially narrowing the interval may be stored as necessary.

The waveform setting data 32 stores waveform pattern data of driving pulses to be output to each recording element 200. The waveform pattern data stored herein particularly includes information of the start timing, pulse width, and voltage amplitude of the driving pulse corresponding to each ink ejection when a plurality of ink ejections are continuously performed. These may be digital data that is a source of the driving pulse generated by the driving waveform signal generating unit 29.

The communication unit 70 performs and controls communication with an external device. For example, the communication unit 70 is connected to an external computer based on a communication standard such as TCP/IP, and can acquire job data including image data to be recorded and output the status of the image recording operation based on the job data. The communication unit 70 may be directly connected to a peripheral device through a USB (Universal Serial Bus) or the like to transmit and receive data.

The operation receiving unit 81 receives an input operation by a user or the like, and outputs the received content to the control unit 40 as an input signal. The operation receiving unit 81 includes, for example, a touch panel, a push button switch, or the like. The touch panel may be located so as to overlap the display screen of the display unit 82, and the operation content may be specified in synchronization with the display content on the display screen.

The display unit 82 displays such as a status and a selection menu for the user and the like. The display unit 82 has, for example, a display screen and an indicator (lamp), and the like. The display unit 82 has, for example, a liquid crystal display, and the like and can display various characters or graphics on the display screen in a dot matrix. The indicator may be used, for example, to indicate the presence or absence, or the like of power supply, or the presence or absence of an operational abnormality with an LED lamp or the like.

The power supply unit 90 supplies power of a voltage corresponding to each unit of the inkjet recording apparatus 1. A voltage corresponding to the peak voltage of each driving waveform is output to a driving substrate 212 of the recording operation unit 20. Alternatively, only the maximum peak voltage may be output to generate a plurality of voltage signals at the driving substrate 212.

In addition to the above components, the inkjet recording apparatus 1 may include a measurer that measures the speed of ejection of ink from each nozzle 27. Alternatively, the inkjet recording apparatus 1 may include a mounting portion for an external measurement device for measuring the speed of ejection of ink from each nozzle 27. The ejection speed may be determined from the landing position based on image data captured by the image capturing unit 50 instead of directly measuring the flying speed of the ink.

Next, driving settings related to the ink ejection operation in the inkjet recording apparatus 1 according to the present embodiment will be described.

Figure 4A:
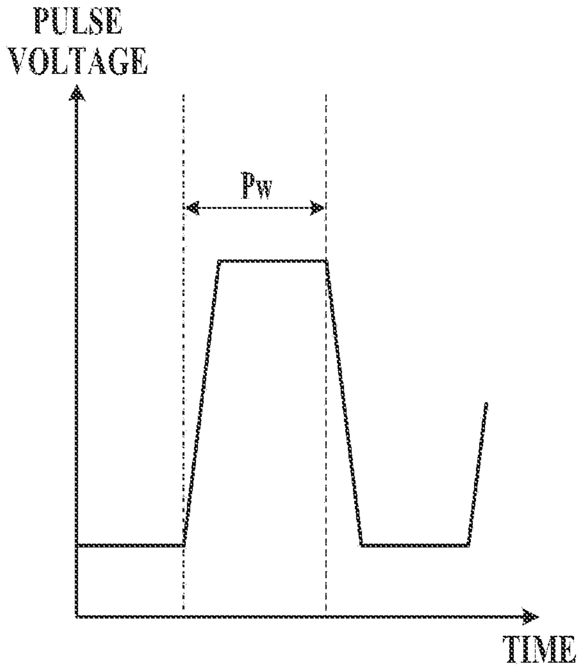
FIG. 4A is a diagram for explaining an ejection pulse.
Figure 4B:
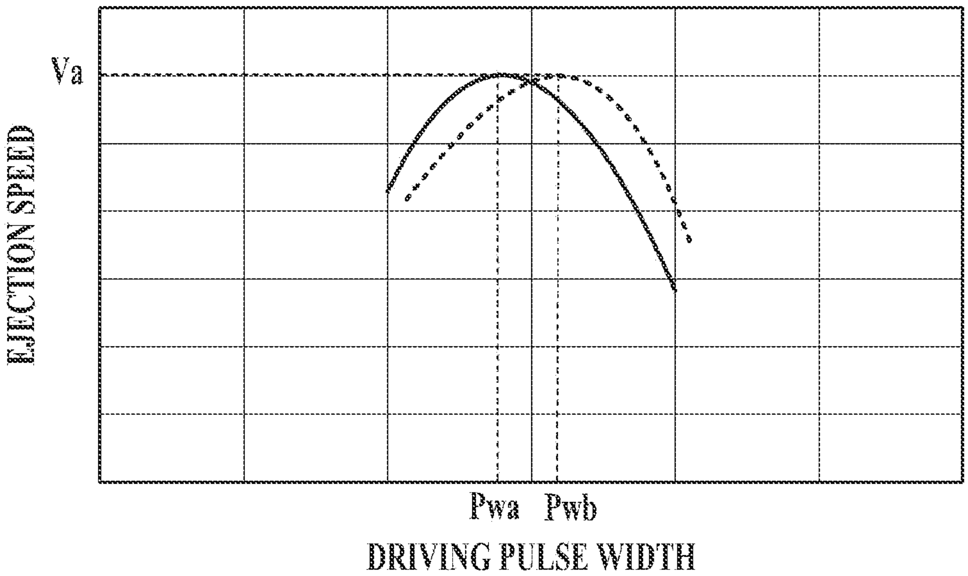
FIG. 4B is a diagram for explaining an ejection pulse.

FIGS. 4A and 4B are diagrams for explaining ejection pulses.

As shown in FIG. 4A, the ink ejection operation herein is performed by applying a pressure fluctuation to the ink through an operation of applying a driving pulse of trapezoidal wave (or rectangular wave) to the piezoelectric element 26 so that the ink supplied to the nozzle 27 is temporarily compressed or expanded in the ink flow path (ink chamber) in front of the nozzle 27 and then returning the ink to the previous state. For the sake of explanation, the rise from the initial voltage of the voltage of the trapezoidal wave and the fall to the initial voltage are shown with easy-to-understand lengths herein. However, the rise time and fall time compared to the period during which the driving voltage is maintained may be set appropriately.

As for the ejection of the ink from the nozzle 27, in the case of pushing for compressing the ink first, the ink pushed out from the opening 27*a* by compressing the ink flow path flies by being separated from the ink in the ink flow path that is pulled back by the operation of returning to the original volume of the ink flow path. In the case of pulling for expanding the ink first, the ink is pulled back from the opening 27*a* of the nozzle 27 to the back of the flow path by expanding the ink flow path is returned to the direction of the opening 27*a* of the nozzle 27 powerfully by the operation of returning to the original volume of the ink flow path. As a result, a part of the ink at the distal portion jumps out from the opening 27*a* to be separated and fly.

In this pressure fluctuation, the ink has a large vibration component with a period corresponding to the above-described AL. By applying a driving pulse with a pulse width (here, the time from the start of the rise to the start of the fall of the driving pulse in the trapezoidal driving wave is assumed to be a pulse width Pw) of AL, the kinetic energy of the ink is efficiently obtained from the driving pulse.

As shown in FIG. 4B, the ejection speed (characteristic value) decreases (changes) according to the applied pulse width, in particular, as the pulse width largely deviates from the actual AL for the nozzle 27. The ejection speed can be approximated by, for example, a quadratic curve or a cubic curve (or a higher-order function) with respect to the amount of deviation of the pulse width from the actual AL. In accordance with the deviation of the AL between the plurality of nozzles 27 (here, two types are illustrated by the thick line and the thin line), the position of the approximation curve also deviates. Usually, if the ink ejection speed at a predetermined representative value Pw0 does not deviate more than the standard between the nozzles 27, the inkjet head 211 having the nozzles 27 can be used. As the representative value Pw0, for example, the AL of a nozzle located at the center in the arrangement of the nozzles 27 is selected.

Figure 5A:
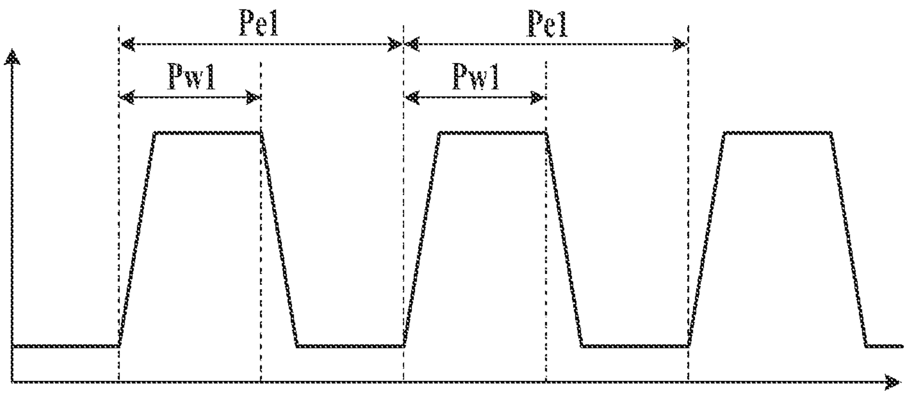
FIG. 5A is a diagram showing an example of a driving waveform when ink is continuously ejected multiple times.
Figure 5B:
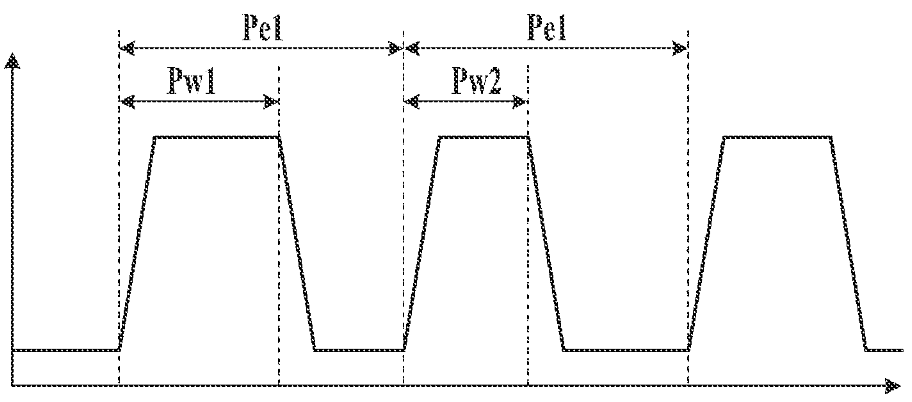
FIG. 5B is a diagram showing an example of a driving waveform when ink is continuously ejected multiple times.

FIGS. 5A and 5B are diagrams showing examples of a driving waveform when ink is continuously ejected multiple times.

As shown in FIG. 5A, in the inkjet recording apparatus 1, the ink density (gradation) of each pixel range is set in multiple stages by combining the ink (multi-drop ink) that is continuously ejected multiple times (a predetermined number of two or more) during flight or by making the ink (multi-drop ink) that is continuously ejected multiple times land within a predetermined pixel range on the medium M. In a case where a pulse width Pw1 is equal to the AL, when the ejection operation is performed multiple times at the ejection period Pe1 that is twice the pulse width Pw1, the vibration is amplified (resonating) by the reverberation of the amplitude of the ink related to the previous ejection operation during the second and subsequent ejections. As a result, the ejection speed increases. On the other hand, when the pulse width Pw1 is not equal to the AL or when the ejection period Pe1 is not twice the pulse width Pw1 or the AL, the ejection speed may not increase during the second and subsequent ejections, and furthermore, the vibration may be weakened to decrease the ejection speed. That is, compared with a case of single-shot ejection, in continuous ejection performed multiple times, variations in ejection speed may increase according to the relationship between the set pulse width and the actual AL of each nozzle.

In the inkjet recording apparatus 1 according to the present embodiment, for example, it is possible to use the inkjet head 211 in which variations in the reference pulse width (actual AL) at which the ink droplet speed (predetermined characteristic value related to ink droplets) takes a maximum value with respect to changes in the pulse width, that is, the ink droplet speed (predetermined characteristic value related to ink droplets) at the actual AL may be so large that it cannot be ignored in terms of image quality (above a predetermined standard according to image quality). Alternatively, a standard, such as when the droplet ejection speed of a driving pulse having a pulse width of the representative value Pw0 (AL of the central nozzle) described above is above a predetermined standard, may be used for convenience. In the inkjet recording apparatus 1, when continuously performing ejection and landing multiple times (especially an even number of times) in the same pixel range (including a case where ink droplets are combined in the middle), a first pulse width Pw1 is made different from a second pulse width Pw2 as shown in FIG. 5B. Problems in image quality due to variations in ejection speed include, for example, deviation of ink landing position, instability of ink droplet flight due to too low ink speed, penetration of ink into the medium M at the time of landing, and variations in spread and fixation, and the like. Since the amount of deviation of the ink landing position depends on the movement speed (transport speed) of the flying medium M and the like, the predetermined standard cannot be uniformly set. However, for example, the deviation amount of the ink landing position may be set based on the maximum movement speed of the medium M that can be executed by the inkjet recording apparatus 1. In the current inkjet recording apparatus 1, the standard for the amount of deviation of the landing position (droplet speed) can be set to 3% or the like, for example. In a case where the predetermined standard may or may not be satisfied depending on the number of continuous ejections, the transport speed, and the like (collectively, the operating conditions), when the predetermined standard is not satisfied under at least one of the conditions, the inkjet head 211 may be controlled to make the first pulse width Pw1 and the second pulse width Pw2 different from each other uniformly regardless of the operating conditions. That is, it is not necessary to switch the setting of each driving pulse according to the operating conditions.

As described above, when the pulse width of the applied driving pulse deviates greatly from the actual AL, the vibration associated with the previous ejection tends to weaken the vibration associated with the next ejection. In this case, the ejection speed decreases significantly. If the later ejected ink is slower than the previously ejected ink, the ink droplets that are supposed to be combined may not be combined during flight. If the speed difference is too large, problems may occur not only in the deviation of the landing position of the ink but also in the shape of the ink droplets or the manner in which the ink droplets land (that is, the image quality and the like may be degraded). For this reason, a plurality of ink droplets should be within the proper speed range.

In the inkjet recording apparatus 1 according to the present embodiment, the pulse width and the like are set by combining two consecutive driving pulses. It is assumed that one of the two driving pulses is a driving pulse (first driving pulse) having the pulse width Pw1 longer than the ALs (including the AL of the nozzle itself through which the ink is ejected) of all the nozzles in one head unit 21 to be adjusted and the other one is a driving pulse (second driving pulse) having the pulse width Pw2 shorter than the ALs (including the AL of the nozzle itself through which the ink is ejected) of all the nozzles in the head unit 21. That is, all the driving pulses are not set as long as the AL for any nozzle. On the other hand, by making the lengths of the two times different, a nozzle to which two pulses having a small length difference from the AL is supplied and a nozzle to which two pulses having a large length difference from the AL is supplied are not generated. This combination of driving pulses may be commonly set as a driving pulse for all nozzles.

Figure 6A:
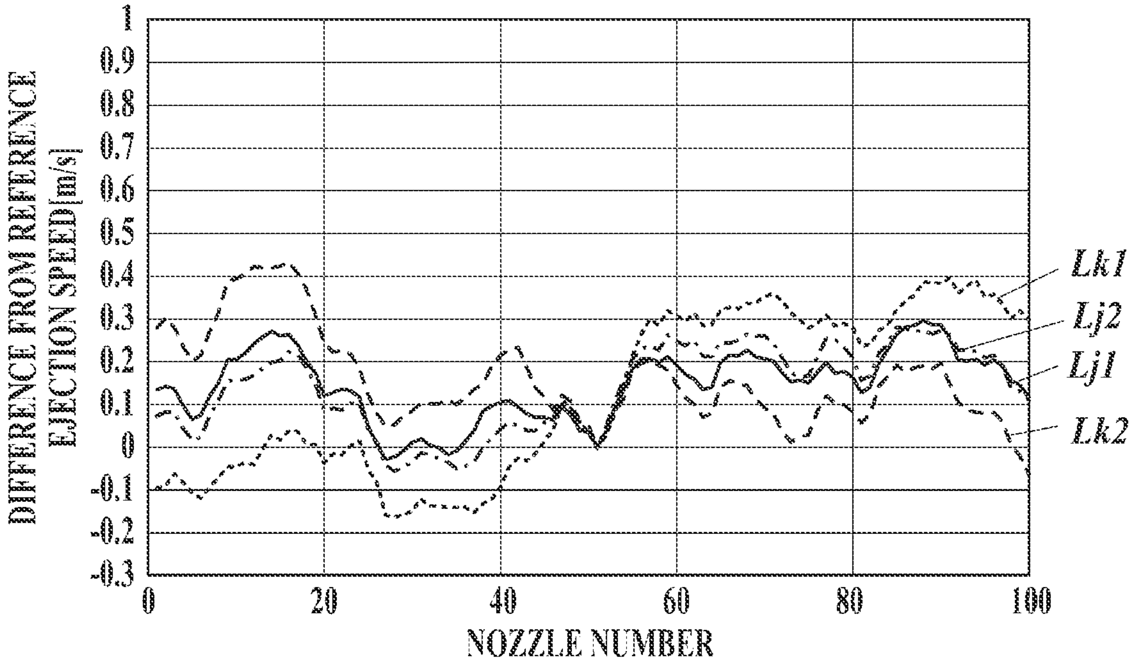
FIG. 6A is a diagram showing an example of the distribution of the ejection speeds of a plurality of nozzles in the inkjet head.
Figure 6B:
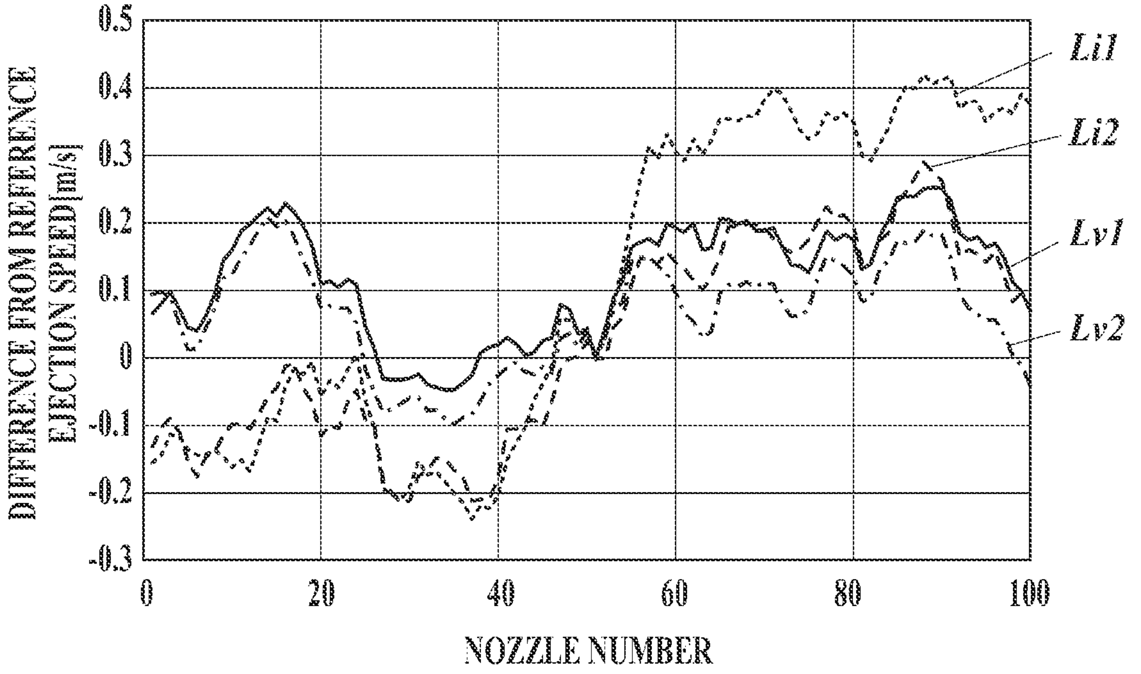
FIG. 6B is a diagram showing an example of the distribution of the ejection speeds of a plurality of nozzles in the inkjet head.

FIGS. 6A and 6B are diagrams showing examples of the distribution of the ejection speeds of a plurality of nozzles (here, 100 nozzles) in the inkjet head 211. In the following description, the ejection speed represents the speed after the ink droplets continuously ejected multiple times are combined. However, when the speed is calculated based on the imaging result of the image capturing unit 50, an average speed from the ejection timing of any ink droplet (for example, the last droplet) to the landing on the medium M may be calculated.

As indicated by a line Lk1 in FIG. 6A, when the ejection operation (here, two ejections) for one pixel is performed with a fixed pulse width Pwm (for example, 8.6% shorter than the representative value Pw0), nozzles with nozzle numbers of 55 and later have a high ejection speed (after a plurality of droplets are combined), and nozzles with nozzle numbers of 45 and before have a low ejection speed. On the other hand, as indicated by a line Lk2, when the same ejection operation is performed with a fixed pulse width Pwp (>Pwm, for example, 8.6% longer than the representative value Pw0), the nozzles with nozzle numbers of 45 and before have a higher ejection speed than that in the case of the pulse width Pwm, and the nozzles with nozzle numbers of 55 and later have a lower ejection speed than that in the case of the pulse width Pwm. That is, it is estimated that the AL is close to the pulse width Pwp for the nozzles with nozzle numbers of 45 and before and the AL is close to the pulse width Pwm for the nozzles with nozzle numbers of 55 and later.

Lines Lj1 and Lj2 respectively show an ejection speed at each nozzle when the pulse width Pw1 is sufficiently shorter than the pulse width Pwm in the first ejection operation of the two ejection operations and the pulse width Pw2 is sufficiently longer than the pulse width Pwp in the second ejection operation. Sufficiently herein means short enough to be shorter than the ALs of all the nozzles and long enough to be longer than the As of all the nozzles, respectively. Unless there is a clear abnormality in the nozzle, even if the ALs of all the nozzles are not actually measured and acquired, the range of AL variation can be roughly assumed based on some measurement results and manufacturing characteristics. Therefore, the pulse widths Pw1 and Pw2 may be set in a range (here, ±15.2% of the representative value Pw0) that is larger than the assumed range of variation. The pulse width satisfies the relationship Pwm+Pwp=Pw1+Pw2. In the line Lj1, the ejection period is twice the pulse width Pwm, and in the line Lj2, the ejection period is twice the pulse width Pwp. In both the cases, the variation in ejection speed is smaller than the variation in the AL of each nozzle, as compared with a case of the fixed pulse width.

Although not particularly limited, for example, the ejection period Pe1 is equal to or less than twice the pulse width Pw2 and equal to or greater than twice the pulse width Pw1. For example, the ejection period Pe1 may be about twice as long as the average AL of all the nozzles, or may be twice the pulse width Pw1 or the pulse width Pw2.

Such a combination of pulse widths is not limited to the case of two ejections, and may be applied to a case of four ejections, for example. In the case of continuously ejecting ink four times or more, a set of two driving pulses may be repeated twice or more. By alternately outputting driving pulses having long and short pulse widths, variations in overall ejection speed are reduced for nozzle rows having portions with different ALs.

Not only when performing ejection continuously four times or more for a single pixel range but also in the case of high-frequency ejection, such as when the ink ejection to the next pixel range is started before the reverberation related to the ink ejection to the previous pixel range disappears, the variation in the ejection speed tends to increase because the influence of the vibration of the ink related to the previous ejection influences the vibration of the ink related to the subsequent ejection.

In FIG. 6(*b*), lines Li1 and Li2 show the distribution of the ink ejection speed for the first pixel and the distribution of the ink ejection speed for the tenth pixel, respectively, when four ink ejections per pixel are performed with a pulse width Pwc (Pwp>Pwc>Pwm, where the pulse width Pwc is 5.7% shorter than the representative value Pw0). The recording period of each pixel (pixel range) is approximately 5.22 times the ejection period. In this case, for nozzles (nozzle numbers of 55 and later) whose ink ejection speed is close to the AL when recording the tenth pixel, the ink ejection speed for the first pixel decreases due to the reverberation of the waveform between pixels. That is, the ejection speed changes depending on the state of continuous operation.

Lines Lv1 and Lv2 show the distribution of the ink ejection speed for the first pixel and the distribution of the ink ejection speed for the tenth pixel when the waveforms having pulse widths P1a and P2a (P1a (=0.686×Pw0) <Pwc<P2a (=1.286×Pw0)) are alternately switched between odd-numbered and even-numbered ejections, respectively. It can be seen that not only is the variation for the first pixel smaller than that indicated by the line Li1, but also the difference between the ink ejection speed distribution for the tenth pixel and the ink ejection speed distribution for the first pixel is smaller than that when the pulse width Pwc is fixed. In this manner, a driving signal in which a long pulse width and a short pulse width are combined is also effective for stability during continuous operation.

A combination of pulse widths that reduces the variation in the relative ejection speed does not necessarily result in conversion to the most efficient kinetic energy (ejection speed). Therefore, a desired ejection speed (absolute value) can be obtained by adjusting the amplitude (voltage) of the driving waveform.

It is necessary to adjust the pulse width from the representative value Pw0 according to the difference in AL for each nozzle when the influence of the variation in AL between nozzles on the image quality is so large that it cannot be ignored as described above. According to the highest transport speed of the medium M or the highest level of the required image quality, for example, when there is a variation of 3% or more in the ejection speed or the amount of ink droplets, it may be necessary to adjust the pulse width from the representative value Pw0 according to the difference in AL for each nozzle. As described above, the pulse widths Pw1 and Pw2 are set to intervals equal to or larger than the interval between the maximum value and the minimum value of the AL variation (for example, about 10%) according to the ejection speed variation. As a result, for example, the pulse widths Pw1 and Pw2 may increase or decrease by about ±20% (40% in total) with respect to the conventionally set representative value Pw0 of the pulse width, or may increase or decrease even more than this.

Figure 7A:
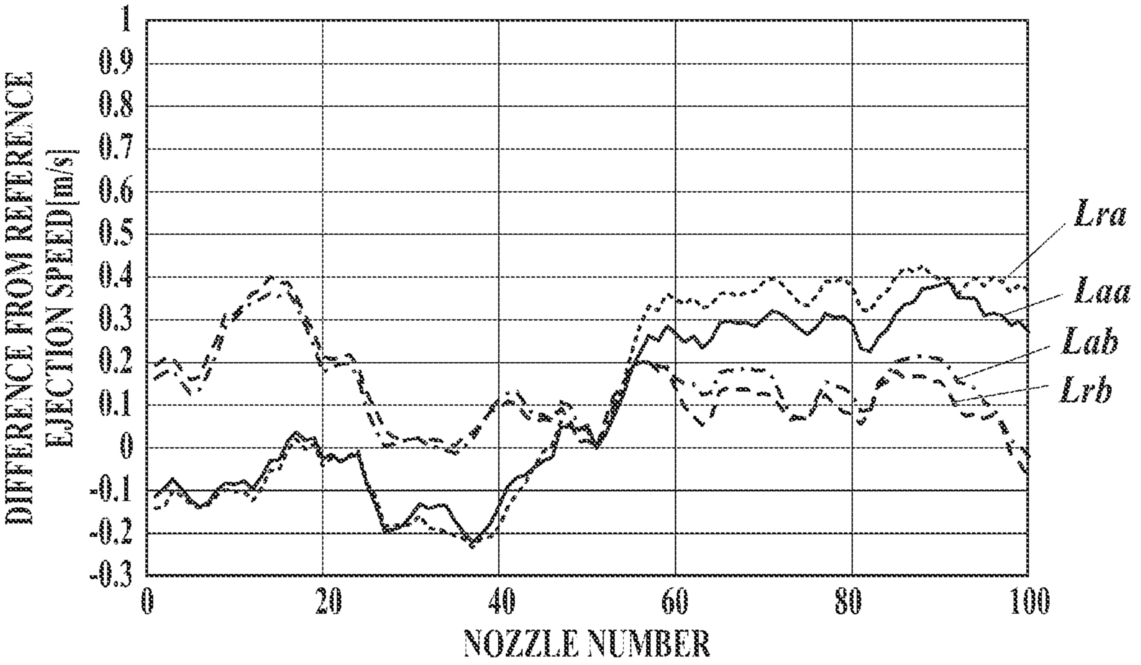
FIG. 7A is a diagram showing an example of the ejection speed distribution when the amount of change in pulse width is changed.
Figure 7B:
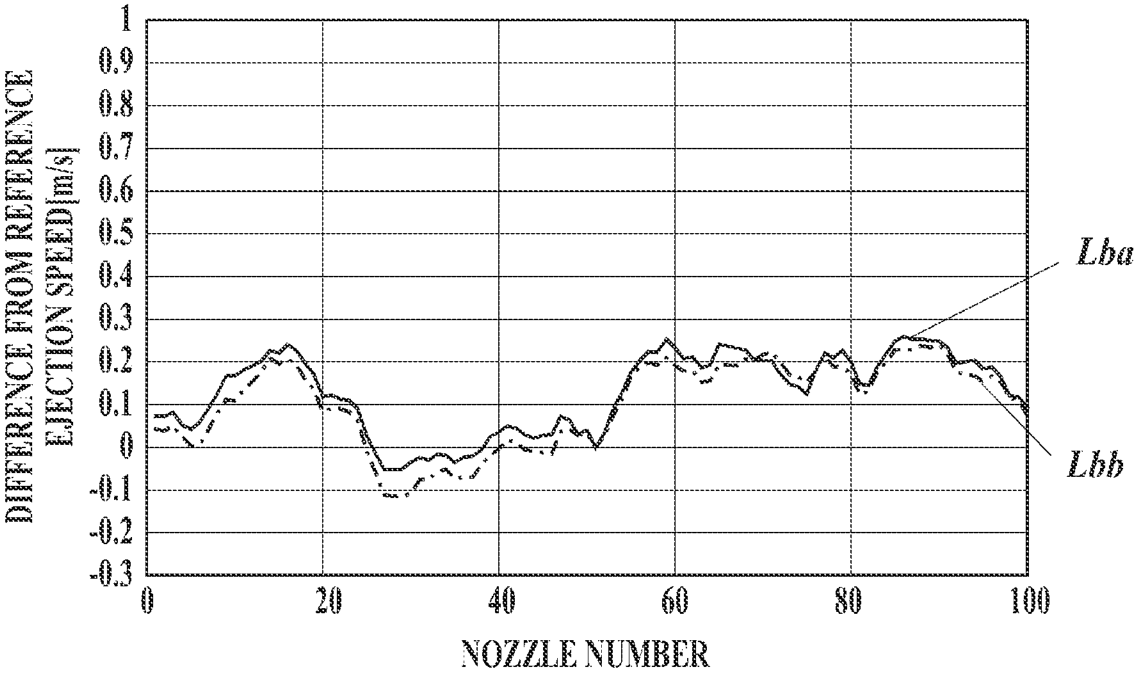
FIG. 7B is a diagram showing an example of the ejection speed distribution when the amount of change in pulse width is changed.

FIGS. 7A and 7B are diagrams showing examples of the ejection speed distribution when the amount of change in pulse width is changed.

In FIG. 7A, the distribution (lines Lra and Lrb) of the ejection speed when the ejection operation is performed four times for one pixel with the fixed pulse width Pwc is compared with the distribution (lines Laa and Lab) of the ejection speed when the second and fourth pulse widths are extended by about 9%. In the lines Lra and Laa, the ejection period is twice the pulse width Pwc, and in the lines Lrb and Lab, the ejection period is twice the second and fourth pulse widths. This level of difference in amplitude does not result in a large change, but there is a tendency that the variation is slightly reduced compared with a case of the fixed pulse width.

In FIG. 7B, the first and third pulse widths are shortened by about 18% from the pulse width Pwc, and the second and fourth pulse widths are extended by about 27% from the pulse width Pwc. The ejection periods for the lines Lba and Lbb respectively are the same as those for the lines Laa and Lab. In these cases, there is a tendency that the variation in ejection speed between nozzles is more effectively reduced.

The piezoelectric element 26 corresponding to each nozzle has variations in sensitivity.

Figure 8A:
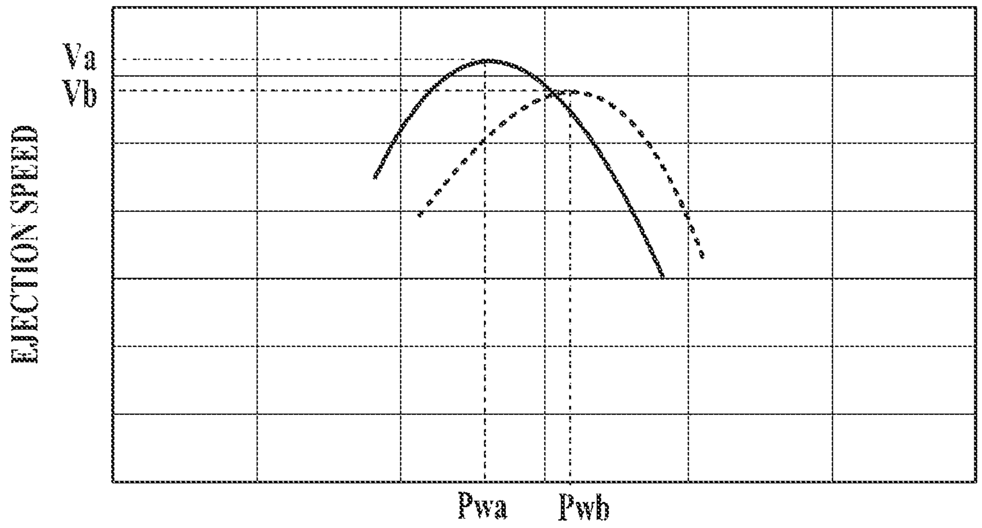
FIG. 8A is a diagram for explaining variations in sensitivity between nozzles.
Figure 8B:
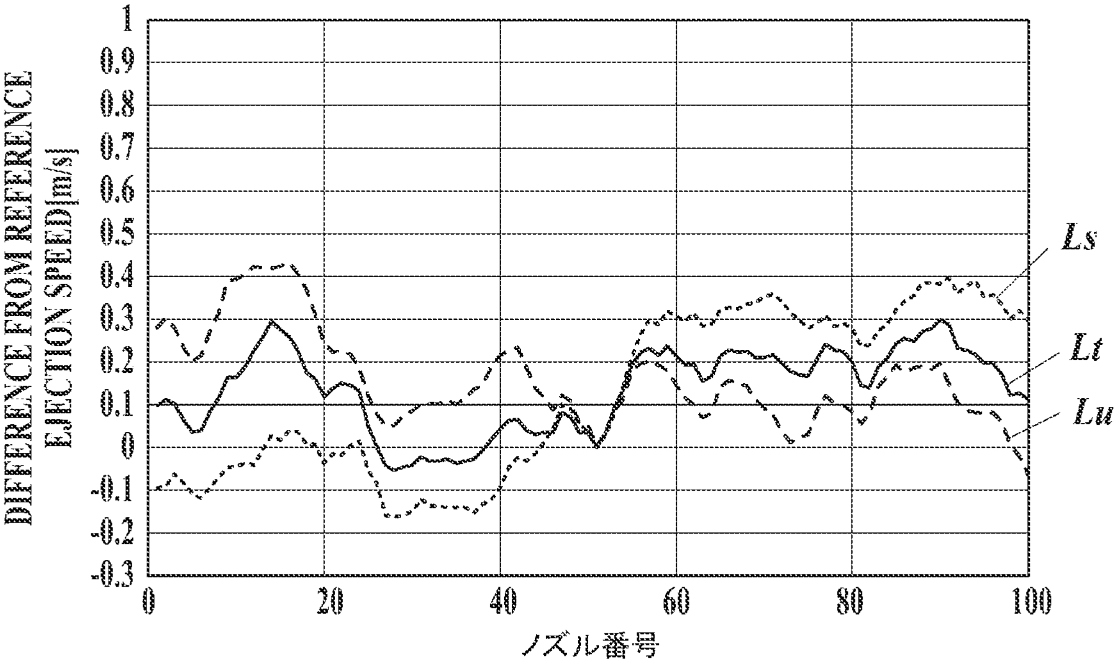
FIG. 8B is a diagram for explaining variations in sensitivity between nozzles.

FIGS. 8A and 8B are diagrams for explaining variations in sensitivity between nozzles.

For example, as shown in FIG. 8A, there are a nozzle whose ejection speed is maximized at the pulse width Pwa and a nozzle whose ejection speed is maximized at the pulse width Pwb, and their maximum ejection speeds Va and Vb are different. That is, even if driving pulses having a pulse width equal to the actual AL are applied, the same ejection speed may not be obtained.

In the example shown in FIG. 8B, when ejection speeds from a plurality of nozzles in the inkjet head 211 are measured at the representative value Pw0 of the pulse width, nozzles with nozzle numbers of 0 to 25 and nozzles with nozzle numbers after 50 apparently have relatively high ejection speeds as indicated by a line Lt. However, when the ejection speeds of the plurality of nozzles are measured at the pulse width Pwm shorter than the representative value Pw0, as indicated by a line Ls, the ejection speeds of nozzles with nozzle numbers of 60 and later tend to further increase, and the ejection speeds of nozzles with nozzle numbers before 50 tend to decrease. On the other hand, when the ejection speeds of the plurality of nozzles are measured at the pulse width Pwp longer than the representative value Pw0, as indicated by a line Lu, the ejection speeds of nozzles with nozzle numbers of 55 and later decrease, and the ejection speeds of nozzles with nozzle numbers before 50 increase. That is, it can be seen that the AL of the nozzles with nozzle numbers of 55 and later is shorter than the representative value Pw0 and the AL of nozzles with nozzle numbers before 50 is longer than Ps. However, for nozzles with nozzle numbers of 25 to 45, even if the nozzles are driven with the pulse width Pwp close to the AL, their ejection speeds are not greatly different from the ejection speeds of the nozzles with nozzle numbers after 50. That is, it can be seen that the sensitivity of the piezoelectric element 26 itself is low for the nozzles with nozzle numbers of 25 to 45.

In such a case, in the two sets of driving pulses described above, the order of pulse widths is set such that the pulse width of the second (last) driving pulse is closer to the AL (reference pulse width) of the nozzle with low sensitivity (minimum one of the maximum characteristic values (ejection speeds)). When the sensitivity is originally low and the speed tends to be low, the ink tends to land properly as a whole by relatively increasing the speed of the subsequent ink so that the subsequent ink catches up with the leading ink.

Figure 9:
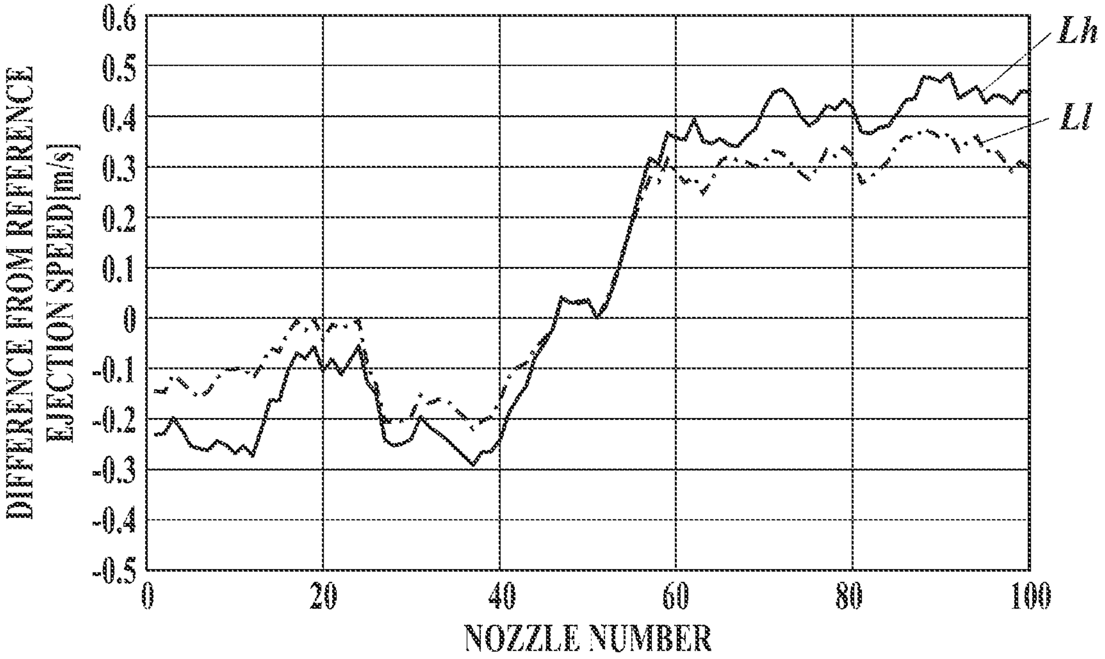
FIG. 9 is a diagram showing an example of the distribution of ejection speeds according to the order of pulse widths when nozzles having different sensitivities are included.

FIG. 9 is a diagram showing an example of the distribution of ejection speeds according to the order of pulse widths when nozzles having different sensitivities are included. The sensitivity of nozzles (piezoelectric elements 26) with nozzle numbers before 50 is relatively low, and the sensitivity of nozzles (piezoelectric elements 26) with nozzle numbers after 50 is relatively high.

A line Lh shows a difference between the reference ejection speed and the ejection speed when the first pulse width is closer to the actual AL for nozzles with nozzle numbers before 50 and the second pulse width is closer to the actual AL for nozzles with nozzle numbers after 50. A line L1 shows a difference between the reference ejection speed and the ejection speed when the first pulse width is closer to the actual AL for nozzles with nozzle numbers after 50 and the second pulse width is closer to the actual AL for nozzles with nozzle numbers after 50. It can be seen that the difference in ejection speed indicated by the line L1 is smaller than the difference in ejection speed indicated by the line Lh.

Next, a pulse width setting operation in the inkjet recording apparatus 1 according to the present embodiment will be described.

As described above, setting the pulse width is not necessary if the AL variation within the head unit 21 is sufficiently small, and is performed instead of discarding the head unit 21 when the AL variation is large. Since the AL at each nozzle 27 deviates from the theoretical value, the ejection speed is measured while shifting the pulse width to perform fitting, and the AL at each nozzle 27 is specified as being equal to the pulse width (reference pulse width) that maximizes the ejection speed by the fitting. The distribution of the AL within the head unit 21 (inkjet head 211) may be estimated based on a predetermined number of measurement data, as described above.

Figure 10:
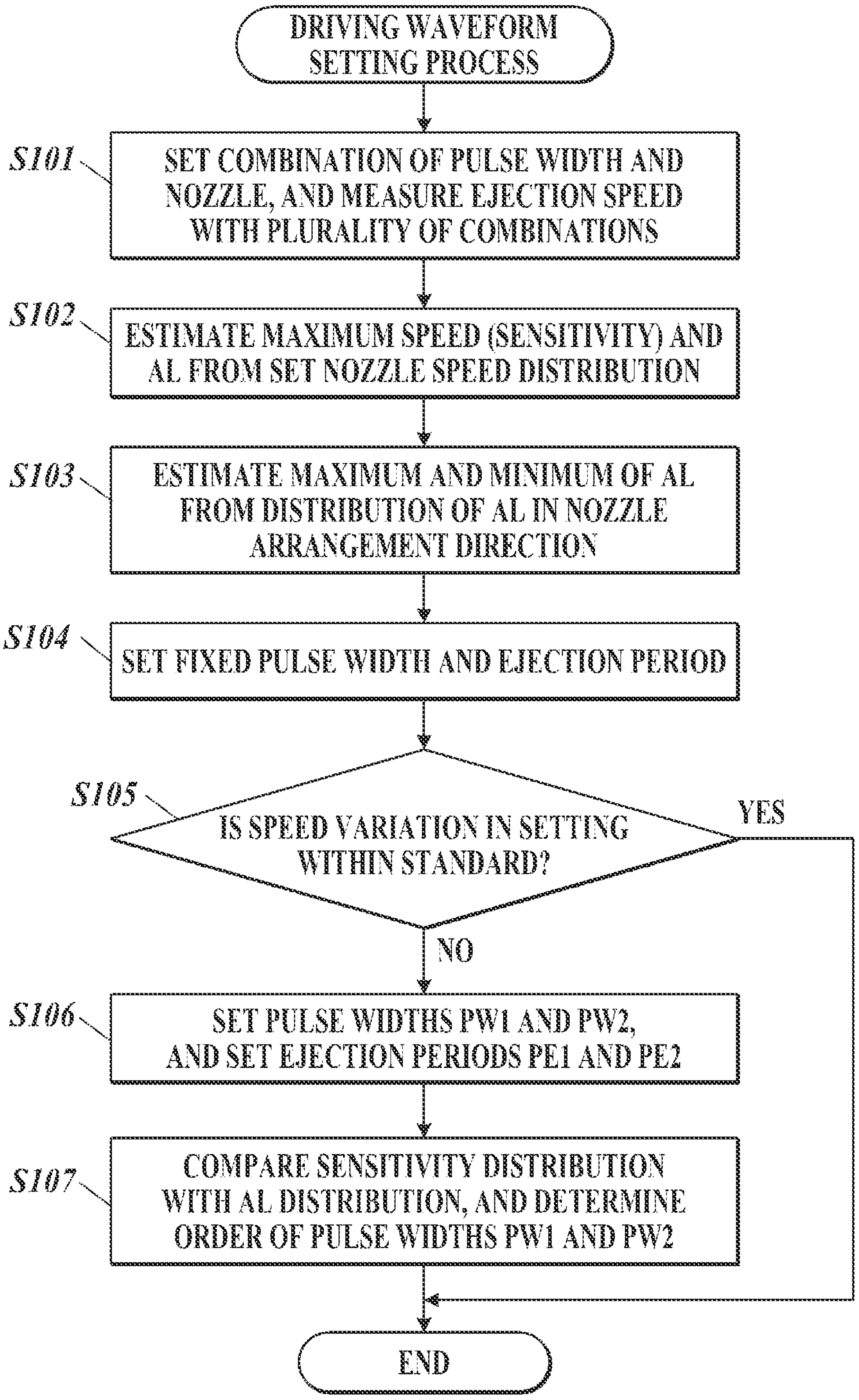
FIG. 10 is a flowchart showing the control procedure of a driving waveform setting process performed by the inkjet recording apparatus.

FIG. 10 is a flowchart showing the control procedure of a driving waveform setting process, which is performed by the inkjet recording apparatus 1 according to the present embodiment, by the control unit 40. The driving waveform setting process is started, for example, in response to an input operation on the operation receiving unit 81 by an inspector at the time of inspection before shipping.

When the driving waveform setting process is started, the control unit 40 (CPU 41) sets a plurality of (for example, three) pulse widths and a plurality of nozzles 27 for measuring the ink ejection speed. The control unit 40 sets all combinations of the pulse widths and nozzle positions, and causes the recording operation unit 20 to eject ink with the set nozzles 27 and pulse widths and causes a measurer to measure the ink ejection speed (step S101).

The control unit 40 performs fitting of the obtained speed distribution for each nozzle 27 whose ink ejection speed is to be measured (for example, fitting by the quadratic curve or the cubic curve described above) to estimate the maximum speed and the pulse width (reference pulse width) at the maximum speed (step S102). The maximum speed can be converted into sensitivity information of the piezoelectric element 26 of the nozzle 27. The reference pulse width is associated with the AL (actual AL) related to the nozzle 27.

The control unit 40 estimates the maximum and minimum values of the actual AL based on the distribution of the actual AL in the nozzle arrangement direction (step S103). The maximum and minimum values do not have to be exact values, and may be estimated at wider intervals (larger maximum value and smaller minimum value). For this estimation, the control unit 40 may additionally acquire measurement data of the ink ejection speed at the plurality of pulse widths for some nozzles 27. In addition, the control unit 40 may use fitting or the like to estimate the maximum and minimum values.

The control unit 40 sets a fixed pulse width and an ejection period Pe based on the estimated AL of each nozzle (step S104). The fixed pulse width may be the conventionally set representative value Pw0, but is not limited thereto. The ejection period Pe may be twice the fixed pulse width.

The control unit 40 determines whether the variation in the ink ejection speed of all the nozzles 27 at the set fixed pulse width falls within a predetermined standard (step S105). For example, the control unit 40 calculates how much the ink ejection speed from the nozzle 27 with the AL farthest from the fixed pulse width (either the maximum value or the minimum value of the AL; Both may be mechanically selected) is lower than the ink ejection speed at the AL. If it is determined that the variation in the ink ejection speed of all the nozzles 27 at the set fixed pulse width falls within the predetermined standard ("YES" in step S105), the control unit 40 determines the set fixed pulse width and ejection period Pe, and ends the driving waveform setting process.

If it is determined that the variation in the ink ejection speed of all the nozzles 27 at the set fixed pulse width does not fall within the predetermined standard ("NO" in step S105), the control unit 40 sets the pulse widths Pw1 and Pw2 and the ejection periods Pe1 and Pe2 based on the estimated maximum and minimum values of the AL (step S106). The pulse widths Pw1 and Pw2 may be obtained, for example, by multiplying the median value (average value) of the maximum and minimum values of the AL by a predetermined multiple (for example, 1.2 times and 0.8 times, and the like) of the value. The ejection period Pe1 may be, for example, twice the obtained pulse width Pw1 or Pw2. The ejection period Pe2 may be the same as the ejection period Pe1, for example.

The control unit 40 compares the sensitivity distribution in the arrangement direction (width direction) of the nozzles 27 with the AL distribution. The control unit 40 determines the order as to which of the pulse widths Pw1 and Pw2 is to be output first (step S107). The control unit 40 specifies a range of relatively low sensitivity among all the nozzles 27 and acquires a representative AL value in this range. The control unit 40 determines which of the pulse widths Pw1 and Pw2 is closer to the representative AL, and determines the ejection order so that the closer one is output later. The processing of steps S106 and S107 forms a pulse width setting step in the driving control method according to the present embodiment. Then, the control unit 40 ends the driving waveform setting process.

As described above, the inkjet head 211 according to the present embodiment includes a plurality of recording elements 200 each including the nozzle 27 through which the ink is ejected and the piezoelectric element 26 that applies a pressure fluctuation to the ink supplied to the nozzle 27 according to the applied driving pulse. The reference pulse width (actual AL) that maximizes the droplet speed of ink droplets ejected by each of the recording elements 200 according to the driving pulse applied to each of the plurality of piezoelectric elements 26 with respect to the change in the pulse width of the driving pulse has a variation equal to or greater than a predetermined standard. The method for controlling the driving of the inkjet head 211 according to the present embodiment includes a pulse width setting step (that is, the processing of steps S106 and S107 in the driving waveform setting process) in which, when a predetermined number (two or more) of ink droplets ejected according to the predetermined number of driving pulses are made to land in the same pixel range, the predetermined number of first driving pulses each having a pulse width Pw1 longer than the reference pulse width (actual AL) and the predetermined number of second driving pulses each having a pulse width Pw2 shorter than the reference pulse width (actual AL) are combined for each of the plurality of recording elements 200 and obtained combinations are respectively output to the plurality of recording elements 200.

According to such a driving control method, in the inkjet recording apparatus 1 that continuously ejects a plurality of droplets to land on the same pixel range, even in a case where the variations in characteristics between the nozzles 27 are large and the effect is particularly large in a plurality of continuous ejections and accordingly the standard of the inkjet head 211 is not conventionally satisfied, the adverse effects of variations can be reduced more effectively. Therefore, since the inkjet head 211, which has conventionally been discarded, can be used, the manufacturing yield can be increased and the manufacturing cost can be reduced.

In the pulse width setting step, the first driving pulse having a pulse width Pw1 longer than any of the reference pulse widths related to the plurality of recording elements 200 and the second driving pulse having a pulse width Pw2 shorter than any of the reference pulse widths are set. That is, instead of setting the pulse widths Pw1 and Pw2 based on individual reference pulse widths for each nozzle, the long side pulse width Pw1 and the short side pulse width Pw2 are set for the ALs of all nozzles. As a result, the pulse widths Pw1 and Pw2 can be made to be appropriately largely different, and the ejection speed of each nozzle can be stably obtained.

In the pulse width setting step, the pulse width Pw1 and the pulse width Pw2 are commonly set for the plurality of recording elements 200. By commonly setting the pulse widths Pw1 and Pw2 satisfying the conditions for all the nozzles 27, it is possible to easily perform pulse width setting. In addition, since there is no need to change the pulse width for each piezoelectric element 26, the driving operation is also easy.

In the pulse width setting step, the order of the first driving pulse and the second driving pulse is set such that a pulse width closer to the reference pulse width (AL) corresponding to a minimum one of the maximum ink ejection speeds related to the plurality of recording elements 200 becomes the last driving pulse. That is, for the piezoelectric element 26 with low sensitivity, a driving pulse close to the AL is output so that the required ejection speed can be easily obtained with the last driving pulse. As a result, stable ink ejection and operating efficiency with respect to the driving voltage can be obtained without lowering the ejection speed more than necessary.

The predetermined characteristic value is a droplet speed of ejected ink. Since the ink droplet speed is likely to greatly affect the variation in image quality, unevenness in image quality can be easily reduced by using the ink droplet speed as a characteristic value to adjust the alignment between the nozzles 27.

Alternatively, the predetermined characteristic value may be the amount of ink droplets to be ejected. Depending on the content of an image to be recorded or the content of a request from a person who records the image, the unevenness of the ink density (gradation) as a whole may be more important than the ink landing position. Therefore, the present invention is also effective when reducing variations in image quality by using the amount of droplets as a characteristic value.

The predetermined standard for the allowable range of the variations in characteristic values is 3%. Although the influence of variations depends on the transport speed of the medium M or the required image quality, a unique appropriate value may be set based on the generally required average image quality or the like. As a result, it is possible to provide the user of the inkjet recording apparatus 1 with the inkjet head 211, by which an appropriate image quality can be easily and stably obtained, while simplifying inspection and setting work.

The predetermined number related to continuous ejections of ink droplets to a single pixel range is an even number. In the pulse width setting step, the first driving pulse and the second driving pulse are set so as to be alternately output. As a result, it becomes easier to obtain the final ink ejection speed for each nozzle in a well-balanced manner.

The inkjet recording apparatus 1 according to the present embodiment includes: the inkjet head 211 including a plurality of recording elements 200 each including the nozzle 27 through which ink is ejected and the piezoelectric element 26 that applies a pressure fluctuation to the ink supplied to the nozzle 27 according to the applied driving pulse; and the control unit 40 that controls the output of the driving pulse applied to the piezoelectric element 26 to the recording element 200. In the inkjet recording apparatus 1, the reference pulse width (actual AL) that maximizes the droplet speed of ink droplets ejected by each of the recording elements 200 according to the driving pulse applied to each of the plurality of piezoelectric elements 26 with respect to the change in the pulse width of the driving pulse has a variation equal to or greater than a predetermined standard. When a predetermined number (two or more) of ink droplets ejected according to the predetermined number of driving pulses are made to land in the same pixel range, the control unit 40 combines the predetermined number of first driving pulses each having a pulse width Pw1 longer than the reference pulse width (AL) and the predetermined number of second driving pulses each having a pulse width Pw2 shorter than the reference pulse width (AL) with each other for each of the plurality of recording elements 200 and outputs obtained combinations to the plurality of recording elements 200, respectively.

According to such an inkjet recording apparatus 1, the non-standard inkjet head 211, which has conventionally been discarded, can be used as being capable of ejecting ink at a stable ink ejection speed. Therefore, the inkjet recording apparatus 1 can perform a stable image recording operation while reducing the manufacturing/maintenance cost.

The present invention is not limited to the embodiment described above, and various modifications can be made.

For example, although the common driving signal is output to all the recording elements 200 in the inkjet head 211 in the embodiment described above, a driving signal may be set separately or for each group obtained by dividing the recording elements 200 in the inkjet head 211 into several groups. In this case, for the recording element 200 to which a certain driving signal is output, a longer pulse width Pw1 and a shorter pulse width Pw2 than any of the ALs of the recording element 200 may be set respectively.

In the embodiment described above, when the variation in the ejection speed due to the driving signal whose pulse width is the representative value Pw0 exceeds the standard in at least one of the operating conditions, a driving signal based on a combination of the first driving pulse and the second driving pulse is always output for two or more continuous ink ejections per pixel from the corresponding inkjet head 211. However, switching to the operation to output a driving signal based on a combination of the first driving pulse and the second driving pulse may occur only under the conditions exceeding the standard.

In the embodiment described above, the ejection speed of ink droplets is used as a characteristic value, but the present invention is not limited thereto. For example, the amount of ink droplets and the like can also be used as a characteristic value.

In the embodiment described above, the ejection speed measured at a plurality of pulse widths is fitted with a quadratic or cubic function, and the maximum value is used as the reference pulse width (AL). However, the reference pulse width (AL) may be directly obtained by performing measurement at sufficiently narrow intervals near the maximum value.

The order of ejection according to the sensitivity of the piezoelectric element 26 may not be taken into consideration, or one of the longer driving pulse and the shorter driving pulse may always be preceded and the other may always follow the one driving pulse.

The specific configuration, the content and procedure of the processing operation, and the like shown in the above-described embodiment can be appropriately changed without departing from the spirit and scope of the present invention. The scope of the present invention includes the scope of the present invention described in the claims and the equivalent scope thereof.

INDUSTRIAL APPLICABILITY

The present invention can be used for a method for controlling the driving of an inkjet head and an inkjet recording apparatus.

REFERENCE SIGNS LIST

1 inkjet recording apparatus
10 transport unit
11 driving roller
12 transport belt
13 driven roller
14 transport motor
15 roller
20 recording operation unit
21, 21C, 21M, 21Y, 21K head unit
25 head driving unit
26 piezoelectric element
27 nozzle
27*a* opening
29 driving waveform signal generating unit
30 storage
31 AL measurement data
32 waveform setting data
40 control unit
41 CPU
42 RAM
50 image capturing unit
70 communication unit
81 operation receiving unit
82 display unit
90 power supply unit
200 recording element
210 carriage
211 inkjet head

The invention claimed is:

1. A method for controlling driving of an inkjet head including a plurality of recording elements each including a nozzle through which ink is ejected and a driving element that applies a pressure fluctuation to ink supplied to the nozzle according to an applied driving pulse, wherein each recording element of the plurality of recording elements has a reference pulse width of the driving pulse that maximizes a predetermined characteristic value related to ink droplets ejected by the each recording element according to the driving pulse applied to the each driving element with respect to a change in pulse width of the driving pulse, and the reference pulse widths for the plurality of recording elements have a variation equal to or greater than a predetermined standard, and the driving control method includes a pulse width setting step in which, a predetermined number of driving pulses that are combined to eject respective ink droplets that are made to land in the same pixel range are set, the predetermined number of driving pulses includes a first driving pulse having a pulse width longer than a representative reference pulse width of the reference pulse widths of the plurality of recording elements and second driving pulse having a pulse width shorter than the representative reference pulse width, and the predetermined number of driving pulses are output to each of the plurality of recording elements; and the driving control method includes an order determination step in which an order of the first driving pulse and the second driving pulse is determined based on sensitivities of the plurality of recording elements and the reference pulse widths of the plurality of recording elements.

2. The driving control method according to claim 1, wherein, in the pulse width setting step, the pulse width of the first driving pulse and the pulse width of the second driving pulse are commonly set for the plurality of recording elements.

3. The driving control method according to claim 1, wherein, in the pulse width setting step, an order of the first driving pulse and the second driving pulse is set such that a pulse width closer to the reference pulse width corresponding to a minimum one of the maximum characteristic values related to the plurality of recording elements becomes a last driving pulse.

4. The driving control method according to claim 1, wherein the predetermined characteristic value is a droplet speed of ejected ink.

5. The driving control method according to claim 1, wherein the predetermined characteristic value is an amount of ink droplets to be ejected.

6. The driving control method according to claim 1, wherein the predetermined standard for the variation is 3%.

7. The driving control method according to claim 1, wherein the predetermined number is an even number, and in the pulse width setting step, the first driving pulse and the second driving pulse are set so as to be alternately output.

8. The driving control method according to claim 1, wherein each of the respective ink droplets ejected according to the predetermined number of driving pulses lands separately within the same pixel range on a medium.

9. The driving control method according to claim 1, wherein the pulse width of the first driving pulse is longer than all the actual reference pulse widths of the nozzles and the pulse width of the second driving pulse is longer than the actual reference pulse widths of all of the nozzles.

10. An inkjet recording apparatus, comprising:

an inkjet head including a plurality of recording elements each including a nozzle through which ink is ejected and a driving element that applies a pressure fluctuation to ink supplied to the nozzle according to an applied driving pulse; and a hardware processor that controls an output of the driving pulse applied to the driving element to each of the recording elements, wherein each recording element of the plurality of recording elements has a reference pulse width of the driving pulse that maximizes a predetermined characteristic value related to ink droplets ejected by the each recording element according to the driving pulse applied to the each driving element with respect to a change in pulse width of the driving pulse, and the reference pulse widths for the plurality of recording elements have a variation equal to or greater than a predetermined standard, the hardware processor is configured to set a predetermined number of driving pulses that are combined to eject respective ink droplets that are made to land in the same pixel range, the predetermined number of driving pulses including a first driving pulse having a pulse width longer than a representative reference pulse width of the reference pulse widths of the plurality of recording elements and a second driving pulse having a pulse width shorter than the representative reference pulse width, and output the predetermined number of driving pulses to each of the plurality of recording elements; and the hardware processor is configured to determine an order of the first driving pulse and the second driving pulse based on sensitivities of the plurality of recording elements and the reference pulse widths of the plurality of recording elements.

* * * * *